(12) United States Patent
Stout et al.

(10) Patent No.: US 10,528,581 B2
(45) Date of Patent: Jan. 7, 2020

(54) DATA ANALYTICS FOR ACCESS TO APPLICATION-SPECIFIC CONTENT

(71) Applicant: Microsoft Technology Licensing, LLC, Redmond, WA (US)

(72) Inventors: Robert Stout, Bellevue, WA (US); Marian Chua, Bellevue, WA (US); Harley Adams, Redmond, WA (US); Keri Talbot, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 15/799,426

(22) Filed: Oct. 31, 2017

(65) Prior Publication Data

US 2019/0095504 A1   Mar. 28, 2019

Related U.S. Application Data

(60) Provisional application No. 62/562,650, filed on Sep. 25, 2017.

(51) Int. Cl.
*G06F 16/248* (2019.01)
*G06F 16/28* (2019.01)
*G06F 17/22* (2006.01)

(52) U.S. Cl.
CPC .......... *G06F 16/248* (2019.01); *G06F 16/285* (2019.01); *G06F 17/2247* (2013.01)

(58) Field of Classification Search
CPC .................................................. G06F 21/6254
USPC .................................................. 715/761–765
See application file for complete search history.

(56) References Cited

U.S. PATENT DOCUMENTS

| | | | |
|---|---|---|---|
| 2009/0018996 A1* | 1/2009 | Hunt | G06Q 30/02 |
| 2016/0350658 A1 | 12/2016 | Kedia et al. | |
| 2017/0220359 A1 | 8/2017 | Aguilar-gamez et al. | |
| 2017/0220535 A1 | 8/2017 | Olsen et al. | |
| 2017/0243028 A1* | 8/2017 | LaFever | G06F 21/6254 |

OTHER PUBLICATIONS

"International Search Report and Written Opinion Issued in PCT Application No. PCT/US2018/039212", dated Oct. 1, 2018, 13 Pages.

* cited by examiner

*Primary Examiner* — Cao H Nguyen

(57) ABSTRACT

Non-limiting examples herein relate to generation and presentation of data analytics that provide managers of digital content with audience and content insights in real-time. A representation of data analytics is generated and automatically surfaced for a user through a user interface of an application/service. One set of examples of the present disclosure relates to processing by one or more computing devices for a service that manages client data of the application/service. The service that manages the client data may interface with an exemplary service such as a digital presentation service to obtain the client data, aggregate the client data, analyze the client data and generate exemplary read ratio data analytics, among other executed processing operations. Further sets of examples relate to processing that occurs by a specific front-end application/service that may be configured to automatically surface a representation of the read ratio data analytics for one or more user accounts.

20 Claims, 14 Drawing Sheets

200

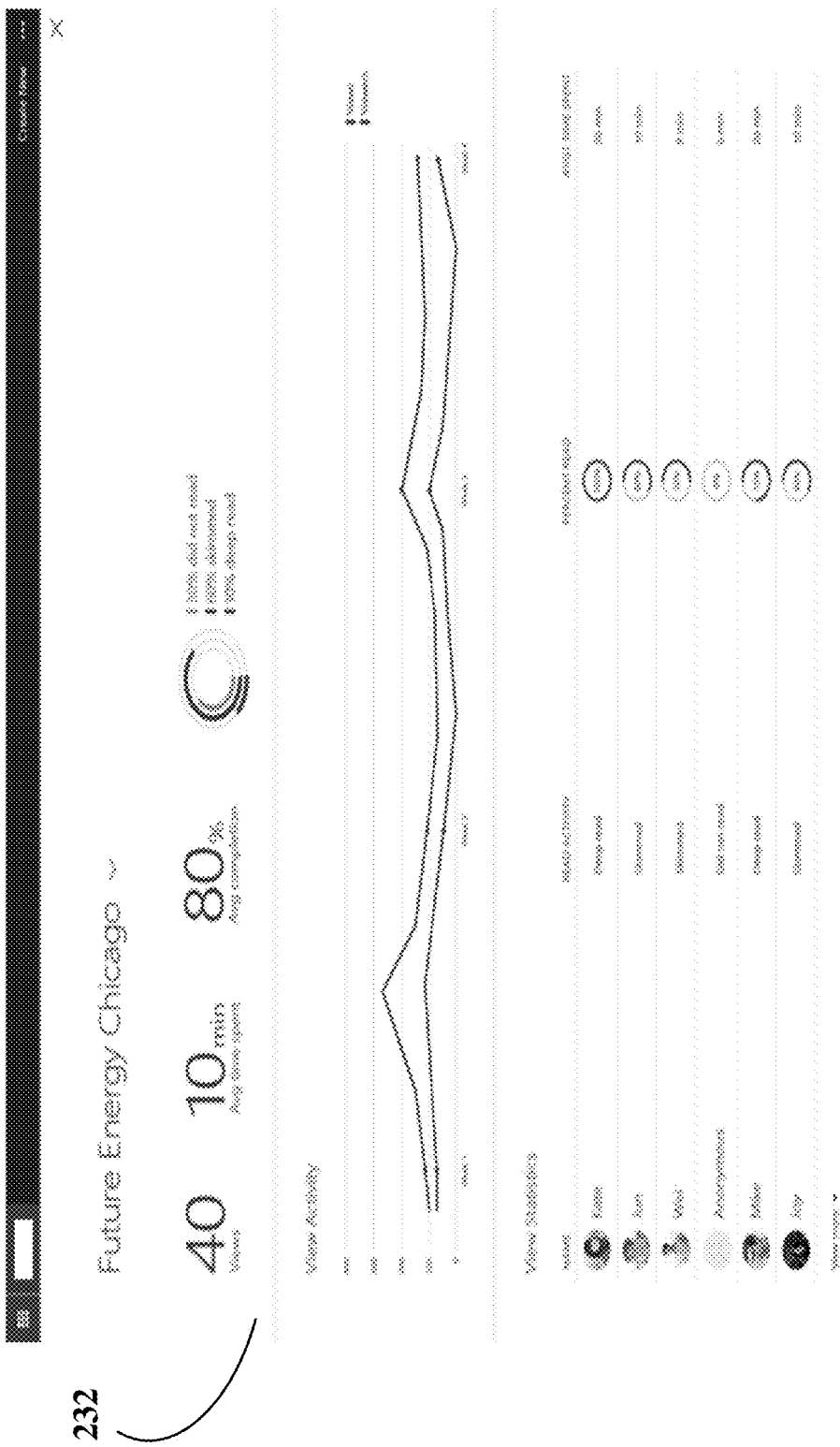

240

250

260

270

280

282

DATA ANALYTICS FOR ACCESS TO APPLICATION-SPECIFIC CONTENT

CROSS-REFERENCE TO RELATED APPLICATIONS

This application claims priority to U.S. Provisional Patent Application No. 62/562,650, entitled "DATA ANALYTICS FOR ACCESS TO APPLICATION-SPECIFIC CONTENT", filed on Sep. 25, 2017, which is incorporated by reference herein in its entirety.

BACKGROUND

Access to digital content is widespread where any number of users may access digital content at any time. Authors of digital content seek knowledge regarding access by other users to their content. However, many applications/services, such as digital presentation services, are not configured to provide analytics for accessed content. In instances where other types of applications/services do provide data analytics related to access to digital content, such data analytics are not detailed enough to provide meaningful in-depth analysis for an author to gain a real-time understanding of access to their content at different levels (e.g. user level, group level, application level, etc.). Further, user interfaces of such application/services are not typically configured to automatically surface real-time data analytics to users.

SUMMARY

Non-limiting examples described herein relate to generation and presentation of data analytics that provide managers of digital content with audience and content insights in real-time. A representation of exemplary data analytics is generated and automatically surfaced for a user through a user interface of an exemplary application/service.

One set of examples of the present disclosure relates to processing by one or more computing devices for a service that manages client data of an exemplary application/service. In one example, client data, for access to a digital presentation document of a digital presentation service, is aggregated to one or more levels of analysis corresponding with access to the digital document by users of the digital presentation service. For instance, client data for access to a digital presentation document may be aggregated a user-specific level and/or a group level (for collective user access), among other instances. Read ratio data analytics for access to the digital presentation document may be generated based on an analysis of the aggregated client data at the one or more levels. As an example, the read ratio data analytics may comprise a metric for categorization of levels of depth of review of the digital presentation document by the users that accessed the digital presentation document. The metric for categorization of the levels of depth of review classifies access by the users into a plurality of categories that correspond to the levels of depth of review. Metrics may be represented in any type of manner without departing from the spirit of the present disclosure including but not limited to: numbers, percentages, badges/icons, colors, etc. Further examples metrics relating to read ratio data analytics are described herein. The read ratio data analytics may be provided to the digital presentation service, where a representation of the read ratio data analytics is surfaced in a user interface of the digital presentation service. For instance, the representation of the read ratio data analytics may be automatically surfaced to a user account that manages the digital presentation document.

Further examples relate to processing that occurs by a specific application/service (or computing devices of the application/service) such as a digital presentation service, among other examples. For instance, the digital presentation service may be configured to correspond with a service that manages client data regarding access to digital presentation documents in the digital presentation service. Based on the correspondence between services, the digital presentation service may generate a representation of the read ratio data analytics that comprises individual read ratio data analytics at one or more levels of analysis. The representation of the read ratio data analytics may be automatically surfaced to users, for example, to a user account that manages the digital presentation document. Other alternative examples are also described herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 2A-2H illustrate exemplary processing device views of an exemplary application/service that is configured to surface real-time data analytics with which aspects of the present disclosure may be practiced.

DETAILED DESCRIPTION

Figure 1A:
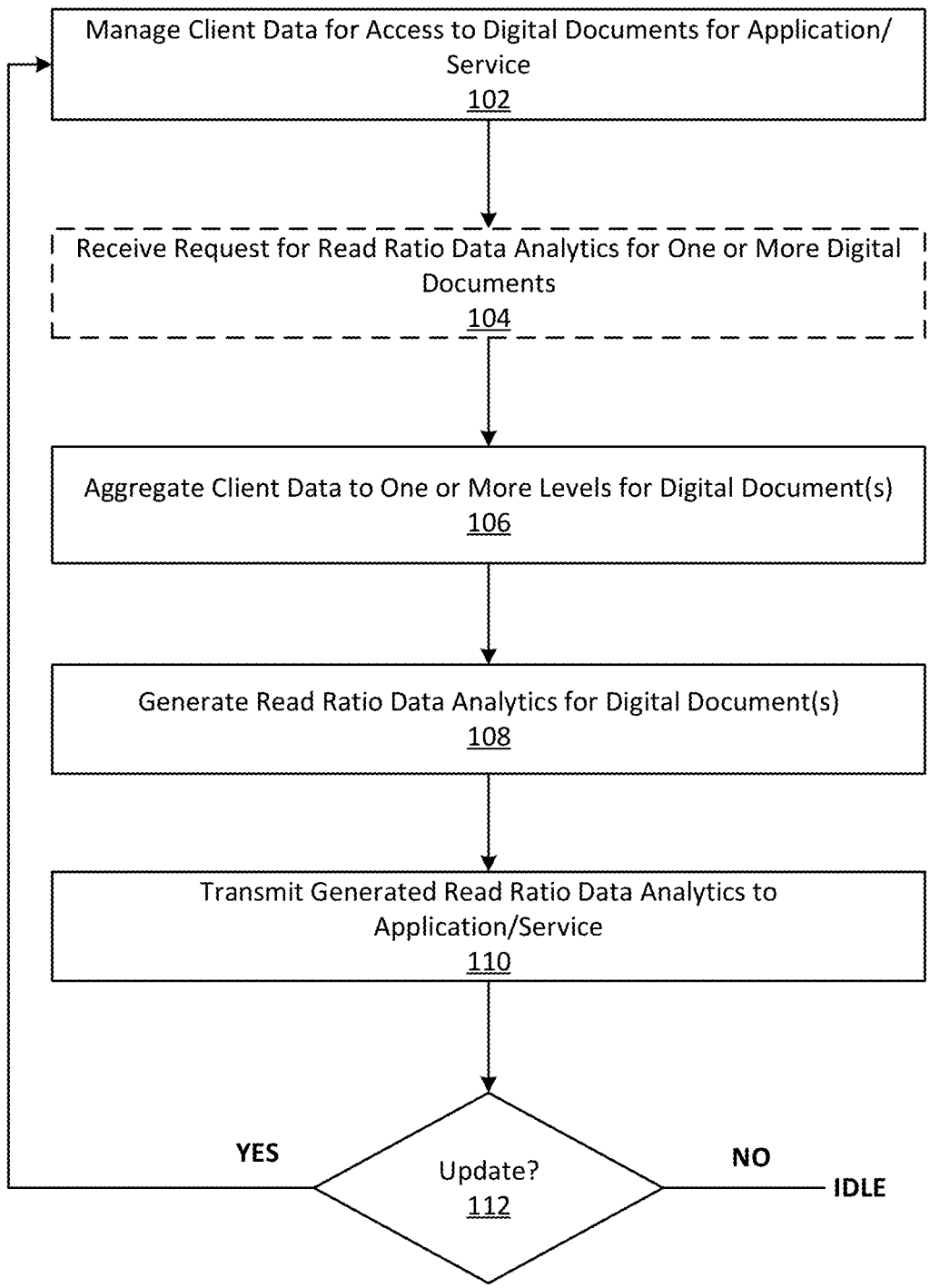
FIG. 1A illustrates an exemplary method related to distributed service examples for generation and surfacing of real-time data analytics within an exemplary application/service with which aspects of the present disclosure may be practiced.

Non-limiting examples described herein relate to generation and presentation of data analytics that provide managers of digital content with audience and content insights in real-time. A representation of exemplary data analytics is generated and automatically surfaced for a user through a user interface of an exemplary application/service. For ease of understanding, an exemplary application/service is a digital presentation service as described herein. However, examples described herein can extend to any type of application/service where a user manages content that is accessible by other users (e.g. digital content authoring applications/services).

As an example, exemplary data analytics, that are surfaced through a user interface, comprise read ratio data analytics. Exemplary read ratio data analytics provide a comprehensive analysis, for managers of digital content, regarding access to the digital content by other users. For ease of understanding the present disclosure, read ratio data analytics is an umbrella term that comprises a plurality multiple levels of analysis provide for user (e.g. author of the digital content) regarding access to the digital content by other users. While examples described herein may enable managers (e.g. authors) of digital content to receive multiple levels of analysis regarding access to their digital content, an exemplary application/service may be configured to initially show, through a user interface, different levels of analysis of the read ratio data analytics. For instance, location as to where the read ratio data analytics are being presented in a user interface may impact how much data is initially shown to a user. In one example, display of read ratio data analytics as a drop-down feature from an application command control (e.g. ribbon control) or a user interface tile display may initially display a higher level of analysis (e.g. indication of views, average time spent reading, average completion percentage, for all user access) as compared with a tab display or banner display because less space of the user interface is being utilized. In other examples, a surfaced representation of exemplary read ratio data analytics may comprise data analytics for collective access to digital content by all users, access by groups/teams of users and access by individual users, among other examples. Surfaced representations of data analytics may be further customizable by users and/or developers of an exemplary application/service.

An exemplary representation of data analytics, provided through a user interface of an application/service, may comprise a plurality of individual read ratio data analytics. Read ratio data analytics may comprise but are not limited to: data pertaining to an amount of visitors/views, data pertaining to an amount (e.g. average, number indication, etc.) of completion of the digital presentation document, data pertaining to time (e.g. average, number indication, etc.) time spent viewing the digital presentation document, categorization of levels of readership by users (individually or collectively), charting and/or rich data objects related to user activity (e.g. over a given time period) a number of times a specific user accesses the specific digital presentation content, determination (e.g. percentage-based) of a read rate and/or scroll rate, analysis of data selection/click log tracking for specific content/links, metrics related to sharing, liking, etc. of the specific digital presentation content, analysis of feedback/comments provided by users and categorization of user access to the digital presentation content through different application/services. Exemplary read ratio data analytics may be represented in any type of manner without departing from the spirit of the present disclosure including but not limited to: numbers, percentages, badges/icons, colors, etc.

An exemplary representation of read ratio data analytics is generated to provide an author (or manager) of the digital presentation document with real-time insight into how thoroughly other users are reviewing specific digital presentation content. For example, a user may be an author of a digital presentation document that is accessible by other users of a digital presentation service. Read ratio data analytics are generated to provide an author with insights that entice the authors to utilize the exemplary application/service over other existing digital presentation applications/services. A surfaced representation of read ratio data analytics may comprise a combination of data analytics for access to digital presentation documentation, where the data analytics may be aggregated to one or more levels (e.g. user, level, group level, stream/channel level, application/service level, etc.). Read ratio data analytics are configured to be quickly and easily digestible for a user, where a user can utilize exemplary read ratio data analytics to easily and efficiently comprehend consumption patterns related to content that is managed by the user. This can assist an author to understand how engaged an audience is with content that the user manages (e.g. how popular it is, how specific users/groups of users interpret content, how much time users spend viewing the provided content, did the author land their message, etc.).

In examples described herein, an exemplary digital presentation service is configured to automatically generate and surface a representation of read ratio data analytics so that a user does not have to manually locate and analyze access to their digital presentation documents. This improves user interaction with an exemplary digital presentation service by adapting a user interface to automatically surface representations of read ratio data analytics for the user as well as providing related to content suggestions for editing of specific digital presentation documents and/or creation of new digital presentation documents. Additionally, users can access read ratio data analytics in numerous ways through an exemplary user interface of a digital presentation service, further improving user interaction. Examples of adaptations of an exemplary user interface for provision of read ratio data analytics are illustrated in at least FIGS. 2A-2H. Further, examples described herein are implemented in an application/service (e.g. digital presentation service) in a manner that limits performance degradation of the application/service, where technical problems related to generating and providing customized data analytics within an application/service are addressed without need for reworking an infrastructure that supports the application/service.

Moreover, examples described herein improve processing efficiency for computing devices and/or application/services that would be utilized in executing metric analysis of digital documents. For instance, computer devices associated with an application/service do not need to execute additional processing operations related to users trying to obtain metric data associated with their digital content and processing operations related to further analyzing such metric data. Additionally, exemplary read ratio data analytics can be utilized to improve interaction of an exemplary digital presentation service with other application/services. For instance, read ratio data analytics may be specific to a digital presentation service but in other examples, read ratio data analytics may be configured to provide metrics that further identify access to a digital presentation document through other application/services (e.g. social networking services, blogs, search engine services, etc.). In one example, a user may post/re-post, tweet/re-tweet, like/dislike, etc. a digital presentation document through a social networking service, among other examples of applications/services, where one or more data analytics may be surfaced in the digital presentation service to indicate details of activity related to the digital presentation document (in other applications/services).

FIG. 1A illustrates an exemplary method 100 related to distributed service examples for generation and surfacing of real-time data analytics within an exemplary application/ service with which aspects of the present disclosure may be practiced. In one example, method 100 is considered from the perspective of a service that is configured manages client data of an exemplary application/service such as a digital presentation service. As an example, method 100 may be executed by an exemplary processing device and/or system such as those shown in FIGS. 3-5. In examples, method 100 may execute on a device comprising at least one processor configured to store and execute operations, programs or instructions. Operations performed in method 100 may correspond to operations executed by a system and/or service that execute computer programs, application programming interfaces (APIs), neural networks or machine-learning processing, among other examples. As an example, processing operations executed in method 100 may be performed by one or more hardware components. In another example, processing operations executed in method 100 may be performed by one or more software components. In some examples, processing operations described in method 100 may be executed by one or more applications/services associated with a web service that has access to a plurality of application/services, devices, knowledge resources, etc. Processing operations described in method 100 may be implemented by one or more components connected over a distributed network.

Method 100 begins at processing operation 102, where client data for access to digital documents of an application/service is managed. In one example, client data for access to digital documents may be managed by one or more computing devices of a data analytics tracking service that is separate from an exemplary application/service in which digital documents are created. As an example, a data analytics tracking service may be a service configured to manage client data for a plurality of application/services (e.g. suite of productivity applications of a platform such as Microsoft® Office 365®, among other examples). In such an instance, client data for a specific application/service may be identified, parsed and analyzed. Client data for an application/service may comprise any type of data related to operation of the application/service.

An exemplary data analytics tracking service may be configured to execute processing operations to track (with user consent) user access to specific digital presentation documents, for example, through one or more application/services, Exemplary client data may comprise an array of document events that describe the way users have interacted with a specific digital presentation document. In one example, an exemplary service may utilize an application programming interface (API) to collect and evaluate application data that indicates user access to specific digital presentation documents. In one instance, exemplary client data is telemetric data regarding access to specific digital presentations documents by users other than a manager of the digital presentation document.

Processing operation 102 may comprise obtaining client data for access to specific digital documents of an application/service such as a digital presentation service, among other examples. In one example, a digital presentation service may transmit client data to the data analytics tracking service for further analysis, for example, based on a setting or trigger initiated from the digital presentation service. Examples of triggers may comprise changes to an access status of a user account of the digital presentation service, where client data is transmitted to the data analytics trading service when a user abandons (e.g. signs-out, inactivity, etc.) the digital presentation service, logs into the digital presentation service, etc. Other triggers may comprise a user specifically making a request for data analytics data through the user interface of the digital presentation service. In other examples, the data analytics tracking service may be configured to retrieve client data from the digital presentation service, for example, by initiating a periodic call to the digital presentation service.

A digital presentation service (or application) is configured to enable users to create digital presentation documents. As an example, an exemplary digital presentation service is Microsoft® Sway®. However, examples described herein may extend to any type of digital presentation service without departing from the spirit of the present disclosure. In some examples, an exemplary digital presentation service may be a component of a suite of productivity applications/services that may be configured to interface with other applications/services associated with a platform. For example, an exemplary digital presentation service may be included in a bundled service (e.g. Microsoft® Office365® or the like). Further, an exemplary digital presentation service may be configured to interface with other internet sources/services including third-party application/services, for example, to enhance functionality. As identified above, a data analytics tracking service is configured to obtain client data for one or more applications/services, for example, where client data for a digital presentation service may comprise data for user access to digital presentation documents and exemplary The digital presentation program may be configured to enable users to create or edit digital presentation documents, for example, from existing digital content (including different electronic documents). For instance, an existing image file may be imported, where additional content can be added including but not limited to: headings, text, links, media content, etc. Digital presentation documents may comprise but are not limited to: slide-based presentations, websites, social networking posts, blogs, etc. In alternate examples, an electronic digital presentation documents can be created from scratch, where users can generate new types of electronic content and incorporate the new types of digital content (and possibly with other existing digital content) into a digital presentation document. An exemplary digital presentation program is further configured to enable users to pull content locally (e.g. from a storage of a specific computing device) or retrieve content via a network connection (e.g. retrieve content from a distributed storage, website, etc.).

As an example, a user interface of Sway® is based around a storyline, into which users add a series of cards. An exemplary card is a digital representation for presentation of content, where cards are then filled with digital content. In examples, different cards are available for different types of digital content, and which can be grouped together into sections. Digital content, intended to be the user's narrative can be easily added, removed, edited or reordered. As compared with other existing presentation services, functionality in Sway® provides a more free-flowing and user-friendly user interface, while also improving processing efficiency (e.g. reduction of computing cycles, resources, digital storage, etc.) needed to manage digital presentation documents.

Examples of document events that may be captured as client data comprise but are not limited to: identification of specific digital presentation documents and content portions of digital presentation documents, timing related to a user account viewing a digital presentation document (e.g. first access, time spent viewing, time closed, etc.), timestamps for access to specific digital presentation documents, total number of content portions (e.g. snap-points or keyframes) associated with a digital presentation document, user actions/interactions, visibility triggers (or reference point tracking) to correlate user actions with respect to specific content portions of a digital presentation document and user indications (e.g. likes, shares, comments, etc.), among other examples.

Flow of method 100 may proceed to processing operation 104, where a request is received for exemplary data analytics for one of more digital documents. In alternate examples of method 100 the data tracking analytics service may initiate analysis of collected client data without request for data analytics by the digital presentation service. However, the digital presentation service may be configured to transmit a request for data analytics to the data analytics tracking service. For instance, the digital presentation service may be configured to create an API call to retrieve data analytics from the data analytics tracking service. API endpoints may be created between a digital presentation service (for client-side computing devices and server-side computing devices) and a data analytics tracking service for interfacing to transmit requests/responses for data analytics. In examples where a request for data analytics is (transmitted to) received at the data analytics tracking service, an exemplary digital presentation service may be configured to filter out personal data associated with user accounts (e.g. JP address splicing, specific user account data, login data, etc.) to protect privacy of users.

In one example, the request received (processing operation 104) by the data analytics tracking service may comprise indication of one or more digital presentation documents. In other examples, the data analytics tracking service may be configured to manage status of digital presentation documents and align received client data with specific digital presentation documents. The request received from the digital presentation service may further comprise request for specific read ratio data analytics.

Exemplary read ratio data analytics provide a comprehensive analysis, for managers of digital content, regarding access to the digital content by other users. For ease of understanding the present disclosure, read ratio data analytics is an umbrella term that comprises a plurality multiple levels of analysis provide for user (e.g. author of the digital content) regarding access to the digital content by other users. While examples described herein may enable managers (e.g. authors) of digital content to receive multiple levels of analysis regarding access to their digital content, an exemplary digital presentation service may be configured to initially show, through a user interface, different levels of analysis of the read ratio data analytics. An exemplary representation of data analytics, provided through a user interface of an application/service, may comprise a plurality of individual read ratio data analytics. Read ratio data analytics may comprise but are not limited to: data pertaining to an amount of visitors/views, data pertaining to an amount (e.g. average) of completion of the digital presentation document, data pertaining to time (e.g. average) time spent viewing the digital presentation document, categorization of levels of readership by users (individually or collectively), charting and/or rich data objects related to user activity (e.g. over a given time period) a number of times a specific user accesses the specific digital presentation content, determination (e.g. percentage-based) of a read rate and/or scroll rate, analysis of data selection/click log tracking for specific content/links, metrics related to sharing, liking, etc. of the specific digital presentation content, analysis of feedback/comments provided by users and categorization of user access to the digital presentation content through different application/services.

An exemplary request that is received (processing operation 104) may comprise a request for any of the above identified read ratio data analytics. For example, the request may comprise request for metrics such as: total views of specific digital documents by users of the digital presentation service, average completion (e.g. percentage) of users that accessed a specific digital presentation document, average time spent viewing a specific digital presentation document, read ratio categorization of user access (individual user or collective group of users) to a specific digital presentation document. An exemplary data analytics tracking service may utilize the request to analyze client data and generate data analytics for the specifically requested metrics.

Flow of method 100 may proceed to processing operation 106, where client data for a specific digital document (or documents) is aggregated to one or more levels. Processing operation 106 may comprise operations that parse and analyze collected client data pertaining to specific digital presentation documents, groups of digital presentation documents and/or all existing digital presentation documents for a user. The collected client data may be analyzed and aggregated at one or more levels (e.g. user, level, group level, stream/channel level, application/service level, etc.). This assists the data analytics tracking service to provide different levels of metrics that may be surfaced through a user interface of an exemplary digital presentation service.

At processing operation 108, aggregated client data is utilized to generate exemplary read ratio data analytics for access to digital presentation documents. Examples of read ratio data analytics have been provided in the foregoing description. The data analytics tracking service may be configured to calculate/re-calculate aggregated data analytics metrics at any point in time (e.g. based on request by the digital presentation service (e.g. through requests/responses), while the digital presentation service is offline, at predetermined intervals (e.g. every 15 minutes), among other examples.

Thresholds may be utilized by the data analytics tracking service to assist with defining data analytics. Thresholds for calculation of specific data analytics may vary according to developer standards. For example, the data analytics tracking service may set a threshold for average completion of users that accessed a specific digital presentation document to user accounts that accessed a digital presentation document for a specific amount of time (e.g. at least 3 seconds). Similar types of thresholds may be set for evaluating different read ratio data analytics. For instance, a categorization of a read ratio for access by users of the digital presentation service may comprise an analysis of levels of depth of review by the users that accessed the digital presentation document. Categorization of the levels of depth of review classifies access by the users into a plurality of categories that correspond to the levels of depth of review. For example, the levels of depth of review comprise: a metric for users that accessed the digital presentation document but did not read the digital presentation document, a metric for users that accessed the digital presentation document and skimmed the digital presentation document and a metric for users that accessed the digital presentation document and completed a deep read of the digital presentation document, among other examples. Thresholds may be set to determine levels of depth (e.g. did the user access the digital presentation document or specific content portion for a threshold period of time).

Moreover, read ratio data analytics may be generated at different levels (e.g. user level, group level, channel level, etc.), where an exemplary representation of read ratio data analytics that is surfaced through a user interface of a digital presentation service may be configured to present read ratio data analytics at one or more levels. In one example, generation of the read ratio data analytics occurs at two or more levels of analysis. For instance, individual read ratio data analytics may be generated at a user-specific level for access by one or more users and individual read ratio data analytics may be generated at a group level that corresponds to collective access to the digital presentation document by the users of the digital presentation service. Alternative interpretations of a group level of users relate to a specific subset or grouping of all users that access a specific digital presentation document. In at least one example, individual read ratio individual read ratio data analytics at a group level comprises two or more selected from a group consisting of: a metric for an average completion percentage associated with viewing of the digital presentation document by the users, a metric for average time spent accessing the digital presentation document by the users and a metric related to total viewership of the digital presentation document by the users. Further examples of metrics calculated at specific levels are illustrated in surfaced representations of exemplary read ratio data analytics that are presented through a digital presentation service (as shown in FIGS. 2A-2H).

Furthermore, an exemplary data analytics tracking service may correlate data obtained from other applications/services to add more comprehensive metric analysis when generating data analytics. As identified above, the data analytics tracking service may be associated with other application/services of a platform, where client data from other applications/services can be cross-referenced to provide further analysis of user activity. For example, other content accessed by user accounts (that access the digital presentation document) may be relevant to provide metric analysis or content suggestions to an author of a digital presentation document.

The data analytics tracking service may generate a response, to the request for data analytics made by the digital presentation service, that comprises data analytics for access to one or more specific digital documents. In some examples, the data analytics tracking service may further execute processing operations to generate a representation of the read ratio data analytics for surfacing in the digital presentation service. In such examples, the representation of the read ratio data analytics may further be provided in response to the request for data analytics made by the digital presentation service. In alternative, examples, the data analytics tracking service is configured to transmit (processing operation 110) the read ratio data analytics to computing devices associated with the digital presentation service, where the digital presentation service may generate a representation of the read ratio data analytics.

Flow of method 100 may proceed to decision operation 112, where it is determined whether there is an update to be made to exemplary client data managed by the data analytics tracking service. If no update occurs to the client data, flow branches NO at decision operation 112, and processing of method 100 remains idle until further update is to occur. In examples where there is an update to client data managed by the data analytics tracking service, flow of decision operation 112 branches YES and processing of method 100 return to processing operation 102 for subsequent processing. For instance, the data analytics tracking service may query the digital presentation service for update to client data or updated client data may be provided by the digital presentation service (e.g. periodically).

Figure 1B:
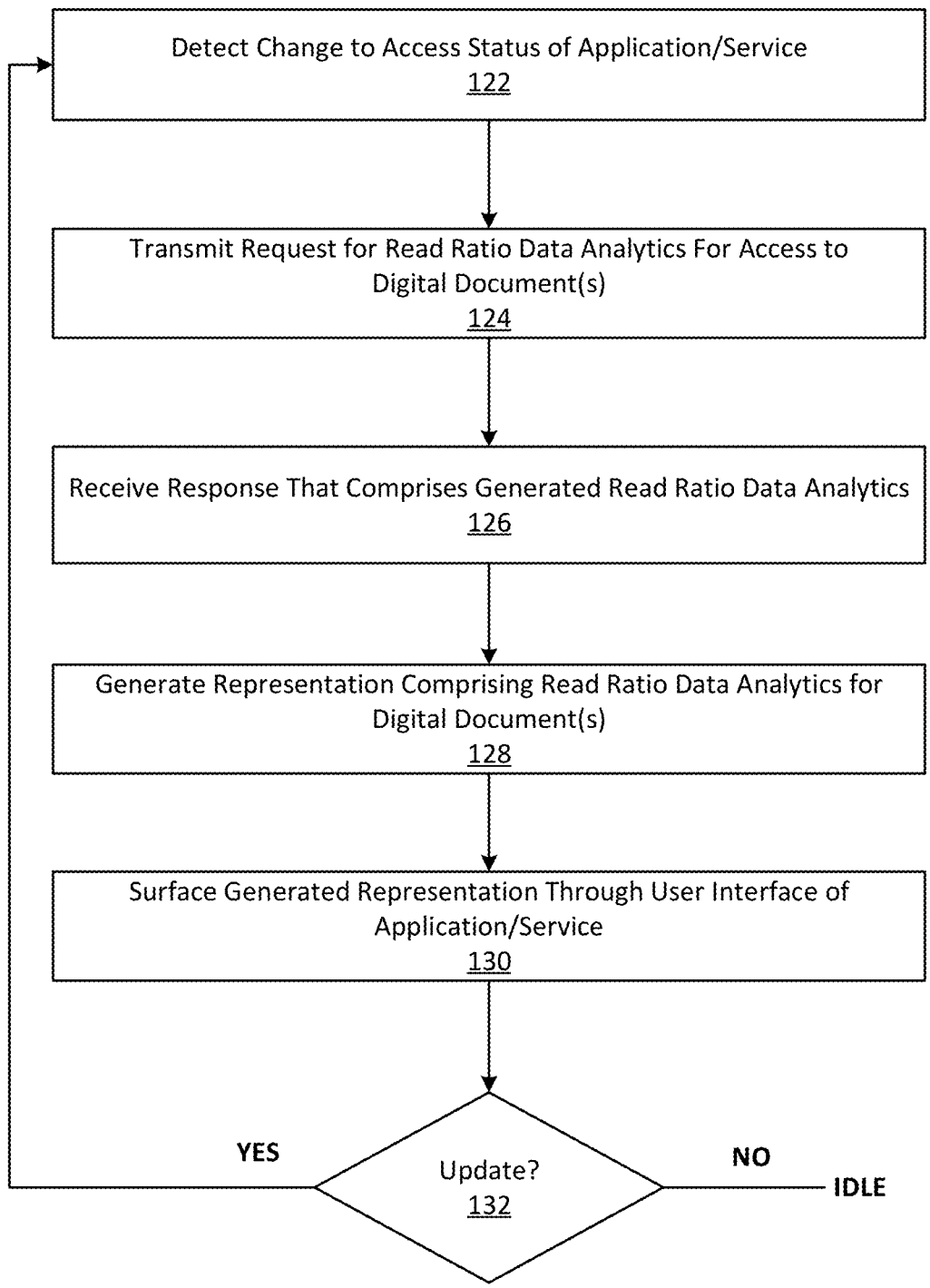
FIG. 1B illustrates an exemplary method related generation and surfacing of real-time data analytics by an exemplary application/service with which aspects of the present disclosure may be practiced.

FIG. 1B illustrates an exemplary method 120 related to generation and surfacing of real-time data analytics by an exemplary application/service with which aspects of the present disclosure may be practiced. An exemplary service may be a digital presentation service as described in the foregoing description. The digital presentation service may interface with other services including a data analytics tracking service to generate and automatically surface data analytics within the digital presentation service.

Figure 3:
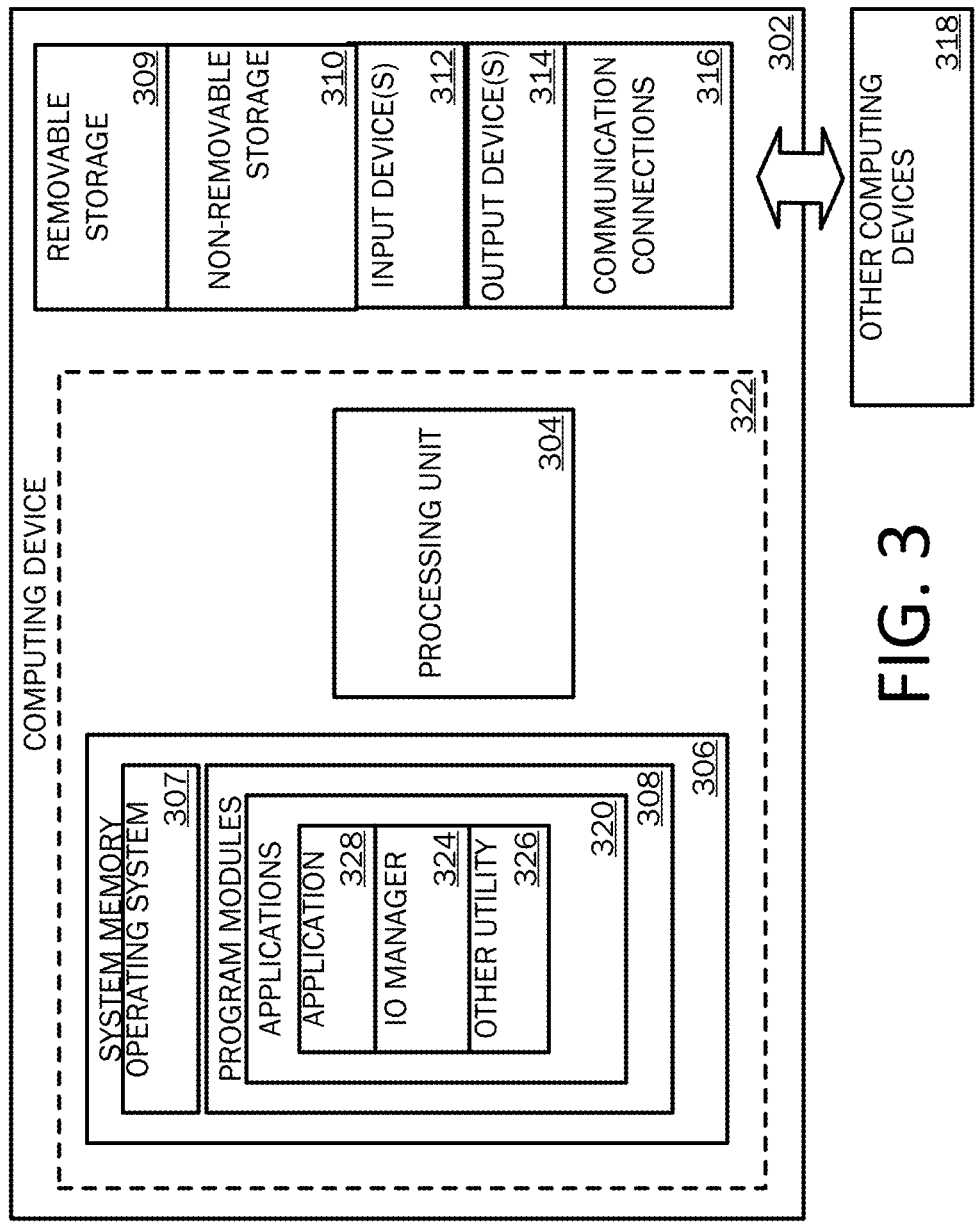
FIG. 3 is a block diagram illustrating an example of a computing device with which aspects of the present disclosure may be practiced.
Figure 4A:
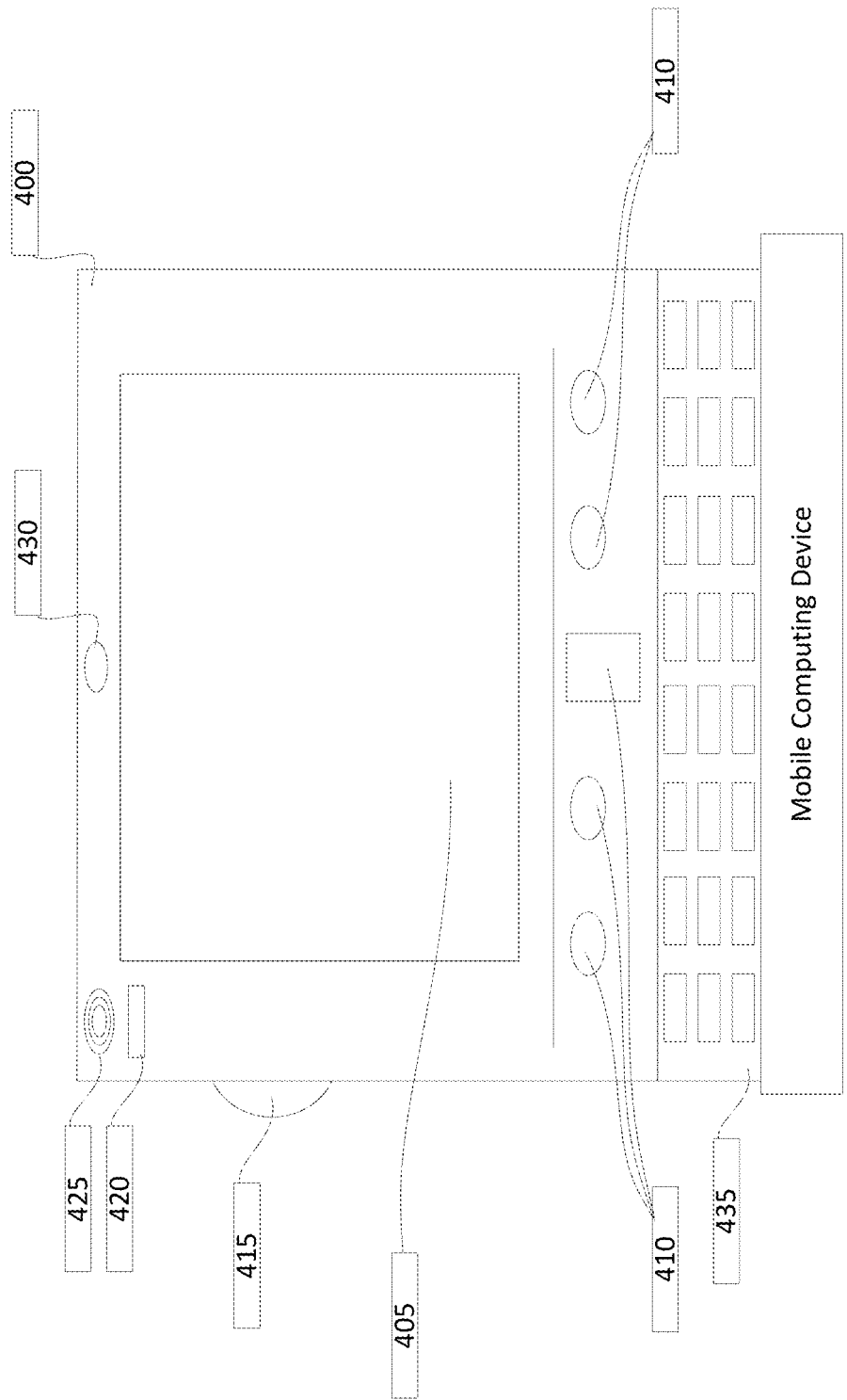
FIGS. 4A and 4B are simplified block diagrams of a mobile computing device with which aspects of the present disclosure may be practiced.
Figure 4B:
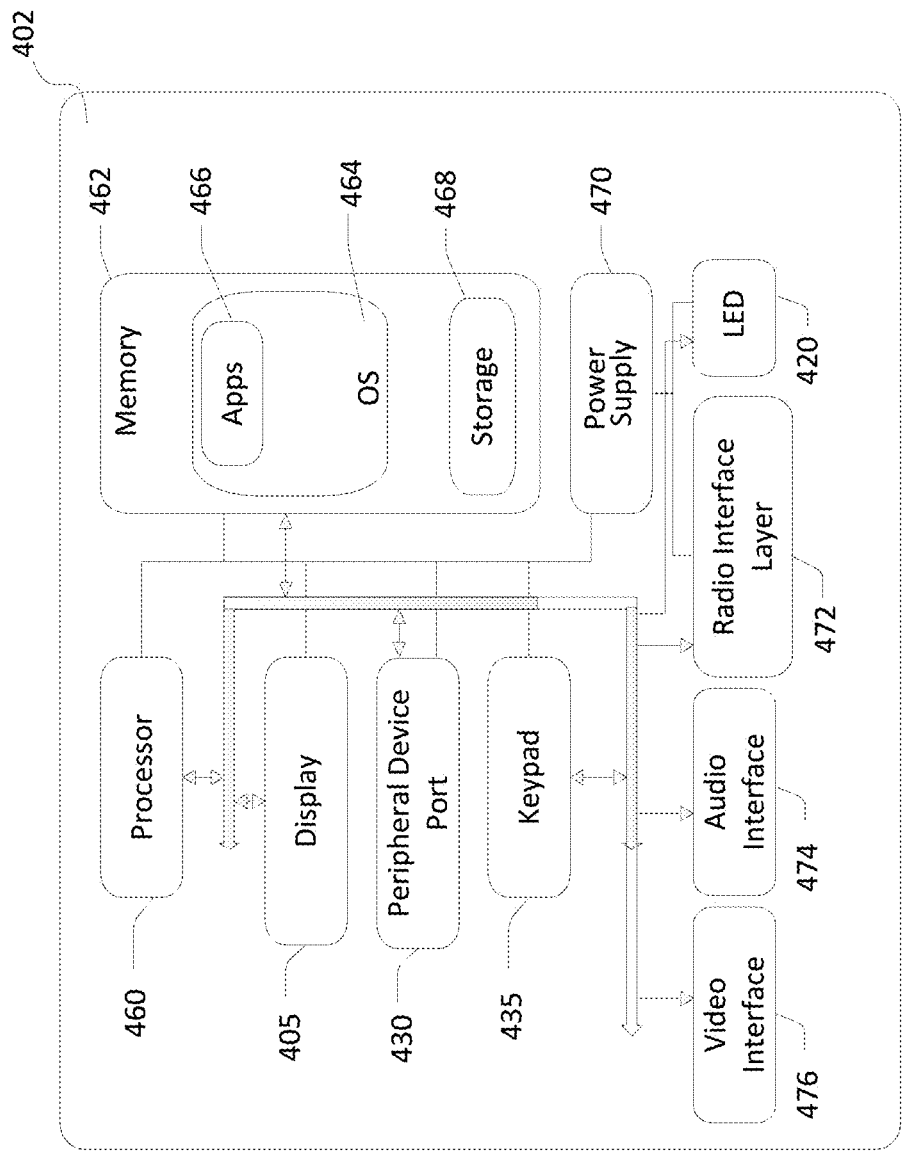
Figure 5:
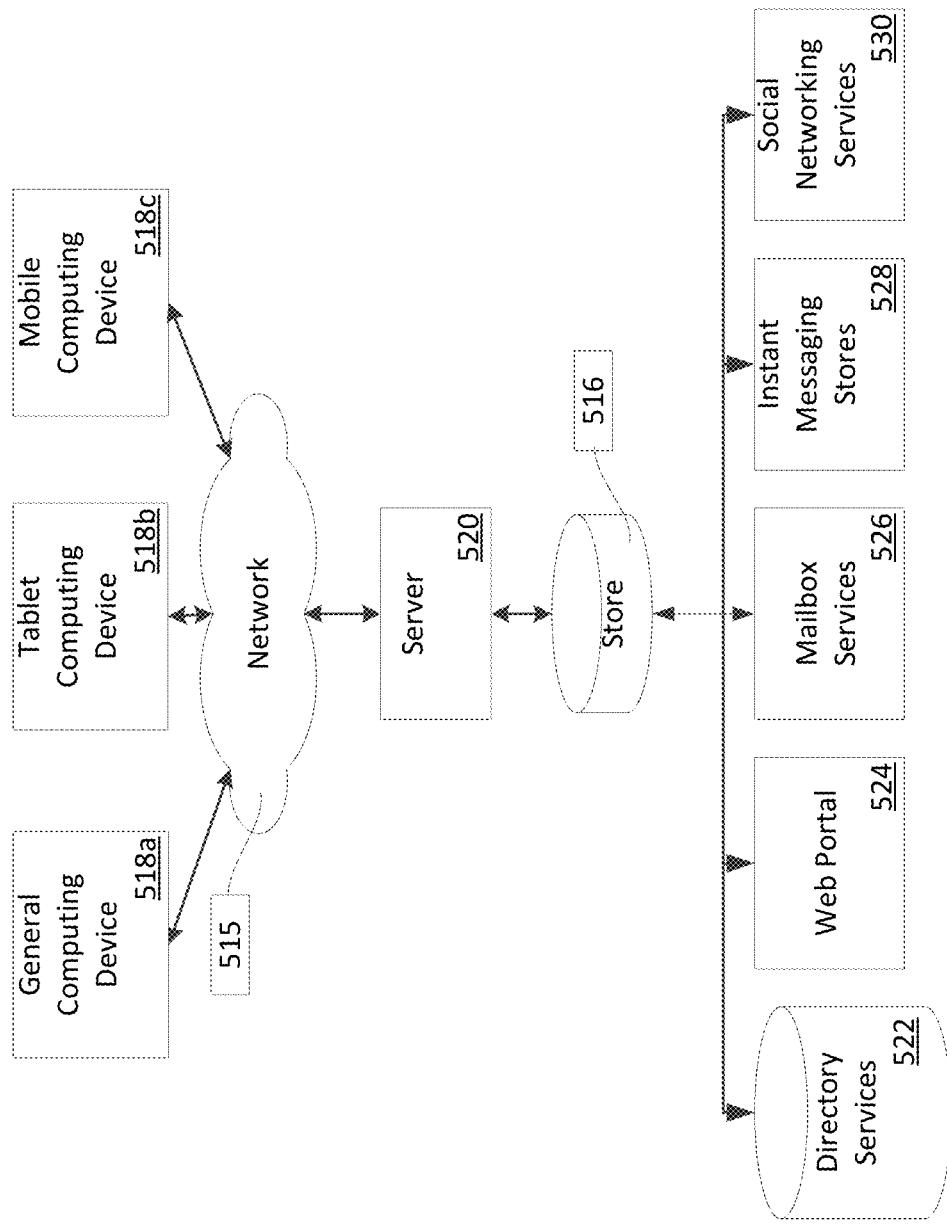
FIG. 5 is a simplified block diagram of a distributed computing system in which aspects of the present disclosure may be practiced.

As an example, method 120 may be executed by an exemplary processing device and/or system such as those shown in FIGS. 3-5. In examples, method 120 may execute on a device comprising at least one processor configured to store and execute operations, programs or instructions. Operations performed in method 120 may correspond to operations executed by a system and/or service that execute computer programs, application programming interfaces (APIs), neural networks or machine-learning processing, among other examples. As an example, processing operations executed in method 120 may be performed by one or more hardware components. In another example, processing operations executed in method 120 may be performed by one or more software components. In some examples, processing operations described in method 120 may be executed by one or more applications/services associated with a web service that has access to a plurality of application/services, devices, knowledge resources, etc. Processing operations described in method 120 may be implemented by one or more components connected over a distributed network.

Method 120 begins at processing operation 122, where a change in access status for a user account of an application/service is detected. Examples of change in access have been referenced in the description of method 100, for example, where an exemplary data analytics tracking service may manage client data for access to specific digital documents of an application/service. As an example, processing operation 122 corresponds with a trigger to initiate communication with an exemplary data analytics tracking service for generation of exemplary read ratio data analytics. Exemplary triggers, that correspond to changes in access status of a user account, have been described in the foregoing description of method 100 (FIG. 1). In one example, a user account that corresponds with an access status is a manager of specific digital presentation content for which data analytics are being generated (and ultimately surfaced).

Flow may proceed to processing operation 124, where the digital presentation service may be configured to transmit a request for read ratio data analytics relating for access to one or more digital documents. In one example, an exemplary request is transmitted to a data analytics tracking service. Examples of communications between a digital presentation service and a data analytics tracking service including data included in requests/responses have been provided in the foregoing description of method 100 (FIG. 1).

Flow of method 120 may proceed to processing operation 126, where a response is received that comprises generated read ratio data analytics. In one example, the response is received (processing operation 126) from a data analytics tracking service that generates data analytics for access to digital presentation documents associated with user accounts of the digital presentation service. Examples of read ratio data analytics as well as data for communications between a digital presentation service and a data analytics tracking service including data included in requests/responses, have been provided in the foregoing description of method 100 (FIG. 1).

At processing operation 128, an exemplary representation of data analytics is generated. An exemplary representation of data analytics may be generated based on the response received from the data analytics tracking service, which comprises generated read ratio data analytics. As indicated in the foregoing description of method 100, alternative examples may comprise those where the data analytics tracking service generates an exemplary representation to be surfaced within a user interface of a digital presentation service.

An exemplary representation of the read ratio data analytics may comprise read ratio data analytics aggregated at one or more levels of analysis. A surfaced representation of read ratio data analytics may comprise a combination of data analytics for access to digital presentation documentation, where the data analytics may be aggregated to one or more levels (e.g. user, level, group level, stream/channel level, application/service level, etc.). Read ratio data analytics are configured to be quickly and easily digestible for a user, where a user can utilize exemplary read ratio data analytics to easily and efficiently comprehend consumption patterns related to content that is managed by the user. This can assist an author to understand how engaged an audience is with content that the user manages (e.g. how popular it is, how specific users/groups of users interpret content, how much time users spend viewing the provided content, did the author land their message, etc.).

As indicated in the foregoing, one or more levels of analysis may be incorporated in a representation of the read ratio data analytics, where processing operations may be executed to determine a presentation point for the read ratio data analytics, which may affect how comprehensive the representation is to be. For instance, read ratio data analytics may be presented to the user through a user interface button, as a drop-down menu from an application command control/ribbon, a tile representation, a user interface tab, a user interface banner, and in a main pane of a user interface, among other examples. Visual examples related to exemplary representations of read ratio data analytics are illustrated in FIGS. 2A-2H. Read ratio data analytics may be represented in any type of manner without departing from the spirit of the present disclosure including but not limited to: numbers, percentages, badges/icons, colors, etc. Processing operations may occur that are configured to detect an access state of an application/service (e.g. digital presentation service) by a user and configure an exemplary representation of read ratio data analytics based on a determined the access state. For example, a user may have first signed-in to the digital presentation service, where a representation of read ratio data analytics may be accessed through an application command control. In such an instance, a higher level of analysis (e.g. collective group level) for access to one or more specific digital documents may be initially provided for a user (e.g. author/co-author of the digital presentation document(s)). As such, location as to where the read ratio data analytics are being presented in a user interface may impact how much data is initially shown to a user. In one example, display of read ratio data analytics as a drop-down feature from an application command control (e.g. ribbon control) or a user interface tile display may initially display a higher level of analysis (e.g. indication of views, average time spent reading, average completion percentage, for all user access) as compared with a tab display or banner display because less space of the user interface is being utilized. In other examples, a surfaced representation of exemplary read ratio data analytics may comprise data analytics for collective access to digital content by all users, access by groups/teams of users and access by individual users, among other examples. Surfaced representations of data analytics may be further customizable by users and/or developers of an exemplary application/service.

Once a representation of data analytics is generated, flow of method 120 may proceed to processing operation 130, where the generated representation is surfaced through a user interface of an exemplary application/service (e.g. digital presentation service). In examples, an exemplary digital presentation surface may be configured to automatically surface an exemplary representation for a user without requiring a user to request data analytics for specific digital documents. In some examples, surfacing of an exemplary representation may be dependent on an access state of a user account as described in the foregoing description. In one instance, read ratio data analytics may not show authors user specific data. For instance, an exemplary representation of read ratio data analytics may aggregate data to a level of a group of users without specifying individual user access to a digital presentation document. In further examples, an exemplary representation of read ratio data analytics may be configured to enable to drill through specific levels of aggregation via a user interface of an exemplary digital presentation service. Further, read ratio data analytics may be able to be shared with other users.

Flow of method 120 may proceed to decision operation 132, where it is determined whether there is an update to be made for automatic display of the representation of read ratio data analytics. If no update is to occur, flow branches NO at decision operation 132, and processing of method 120 remains idle until further update is to occur. In examples where a user interface of a digital presentation service is to be updated, flow of decision operation 132 branches YES and processing of method 120 return to processing operation 122 for subsequent processing.

In examples described, herein calls for analytics data made by an exemplary digital presentation service may be executed separately from currently existing calls for data to improve processing efficiency and minimize a latency impact for data retrieval that may occur if existing calls were modified to include additional requests/responses. That is, data analytics fetching may be separately managed to avoid a slow-down in initial page loading as well as avoidance of generation additional unnecessary calls to data analytics tracking service.

Furthermore, an exemplary digital presentation service may further interface with other application/services to extend functionality of the digital presentation service, for example, to provide suggestions, retrieve content (e.g. through search engine services), provide other user interface features to improve user interaction, etc., based on generated read ratio data analytics.

FIGS. 2A-2H illustrate exemplary processing device views of an exemplary application/service that is configured to surface real-time data analytics with which aspects of the present disclosure may be practiced. In examples shown, an exemplary application/service is a digital presentation service where users can create and manage customized digital documents. Processing operations for generation and automatic surfacing of exemplary representations of data analytics for a digital presentation service have been described in the foregoing description. FIGS. 2A-2H illustrate user interface examples, where an exemplary user interface may be adapted/customized to provide surfacing of data analytics. As digital presentation surfaces were not previously configured to automatically surface data analytics, examples described herein may further correspond to adapting a UI framework to improve a user experience (UX).

Figure 2A:
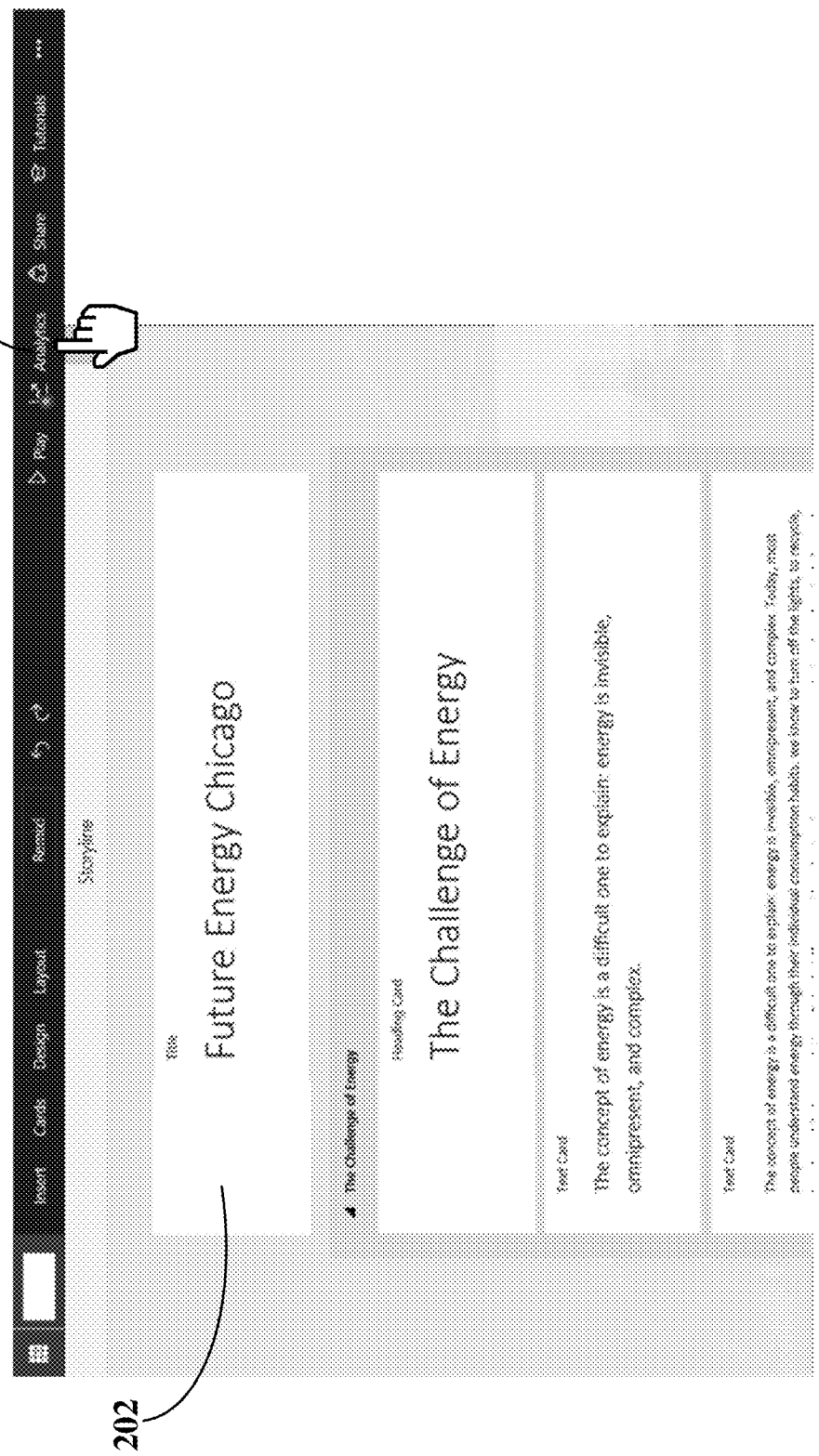

FIG. 2A illustrates processing device view 200, providing a display of a user interface for an exemplary digital presentation service. Within processing device view 200, a digital presentation document 202 (e.g. created storyline that is titled: Future Energy Chicago) is presented within the user interface (UI) of the digital presentation service. Further, processing device view 200 highlights the inclusion of an exemplary application command control UI analytics feature 204 (included in the application command control/ribbon) for access to data analytics for exemplary digital presentation documents such as digital presentation document 202. Processing device view 200 illustrates a user action of a user selecting the application command control UI analytics feature 204 through the UI. This may result in automatic surfacing of a representation of read ratio data analytics (at one or more levels) for the digital presentation document 202.

Figure 2B:
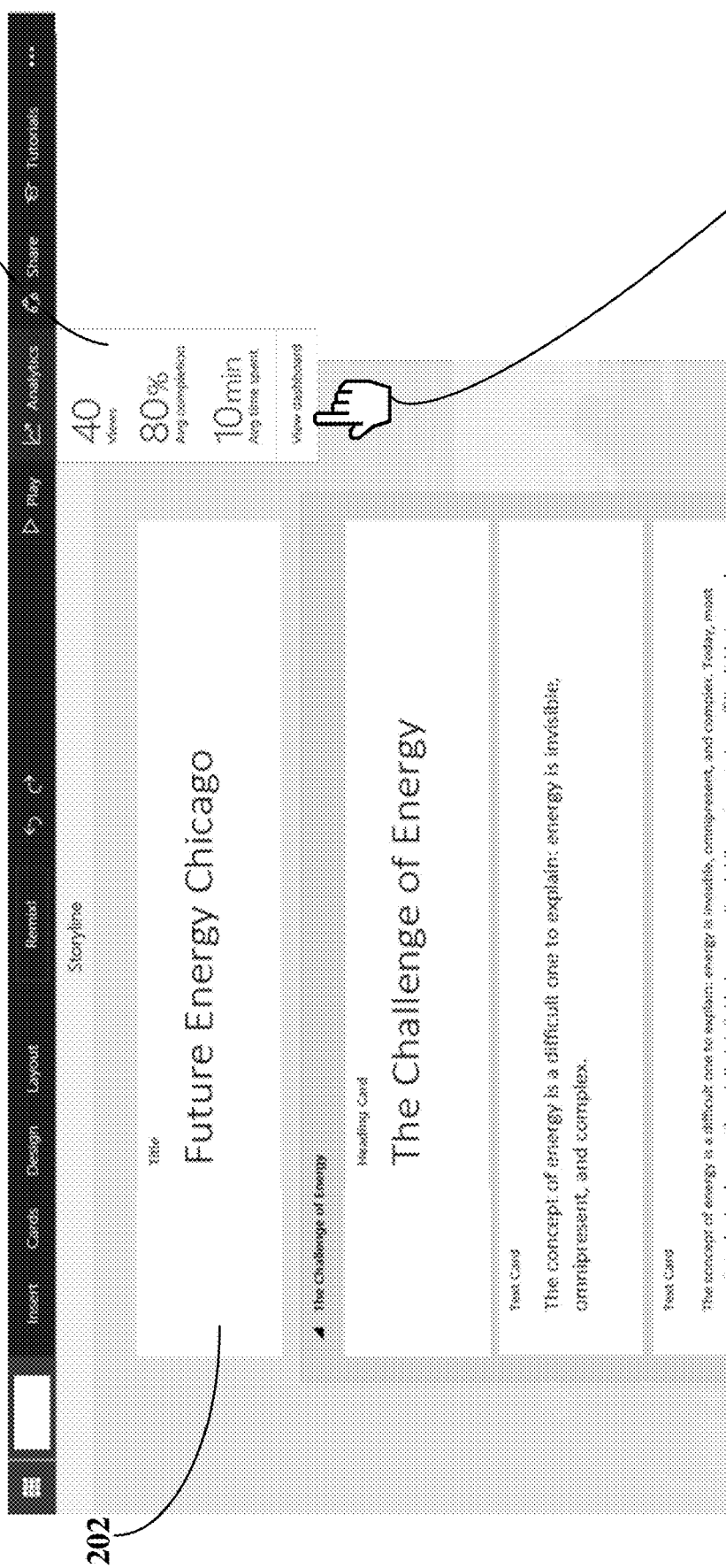

FIG. 2B illustrates processing device view 210, providing a display of a user interface for an exemplary digital presentation service. Processing device view 210 illustrates an example of a result of a user selecting the application command control UI analytics feature 204 through the UI. In processing device view 210, an exemplary representation of read ratio data analytics 212 is automatically surfaced as a drop-down UI feature (from the application command control/ribbon). The representation of read ratio data analytics 212 comprises individual read ratio data analytics that are aggregated to a group level, highlighting collective user access to the digital presentation document 202. As an example, the representation of read ratio data analytics 212 may be presented for a user that is an author/co-author of the digital presentation document 202. As can be seen in processing device view 210, the representation of read ratio data analytics 212 indicates, for the author, 1) a total number of views of the digital presentation document 202 by other users of the digital presentation service; 2) average completion percentage for users that have viewed the digital presentation document 202; and 3) average time spent viewing the digital presentation document 202 by the users that have accessed the digital presentation document 202. In alternate examples, exemplary read ratio data analytics are not limited to percentages and may be any type of metric including numbers, badges/icons, colors, etc. Further, the representation of read ratio data analytics 212 further comprises a UI feature (e.g. view dashboard) to launch a dashboard view of data analytics for the digital presentation document 202. Processing device view 210 illustrates a user action 214 of selecting the UI feature to launch the dashboard view.

FIG. 2C illustrates processing device view 230, providing a display of a user interface for an exemplary digital presentation service. Processing device view 230 illustrates an example of a result of a user action 214 selecting the UI feature to launch the dashboard view. Processing device view 230 illustrates a dashboard view 232 for data analytics of the digital presentation document 202 that is automatically surfaced based on user action 214. As the dashboard view 232 encompasses a majority of a main pane of the UI, a more complete representation of read ratio data analytics is provided through the user interface, where multiple levels of data analytics are provided for the user. As can be seen in processing device view 230, exemplary read ratio data analytics are provided at a group level (for all user access). The group level data analytics comprise categorization of a level of depth of review (e.g. read activity) for collective user access to the digital presentation document 202. Additionally, the representation provided in the dashboard view 232 further comprises graphical analysis of viewing activity over a given time period, where an author can gain further understanding of viewing patterns. Moreover, the representation of read ratio data analytics provided in the dashboard view 232 further comprises individual read ratio data analytics aggregated to a user-specific level. Statistical analysis of access by individual users is provided in the dashboard view 232, including: identification of individual users, read activity by that user (e.g. categorization of depth level of review), indicators for percentage of the digital presentation document 202 that the user read/viewed and an indicator of an average spent time viewing the digital presentation document (e.g. where the average spent time is a metric that contemplates that a user may have accessed a digital document more than once).

Figure 2D:
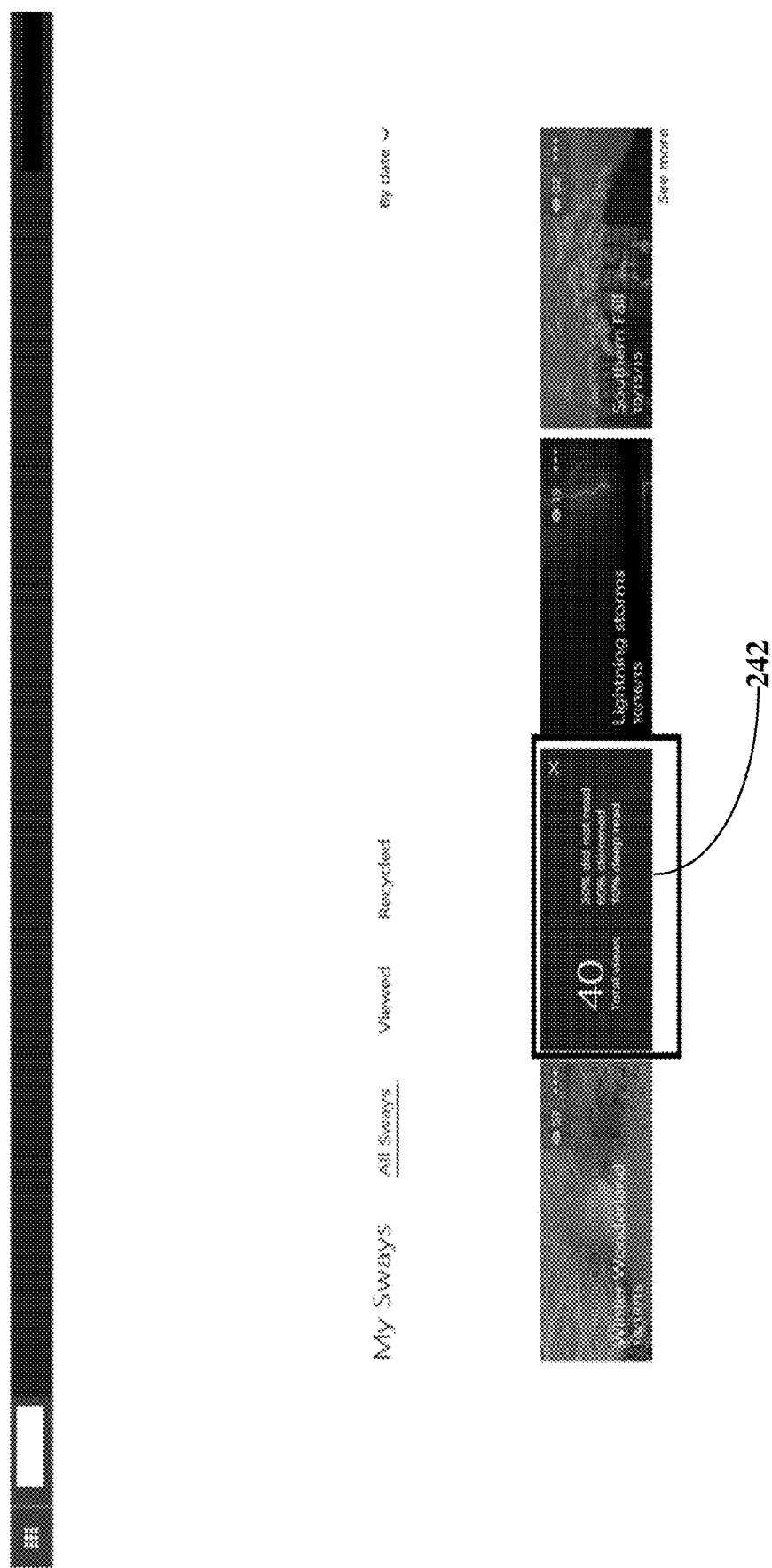

FIG. 2D illustrates processing device view 240, providing a display of a user interface for an exemplary digital presentation service. Processing device view 240 illustrates an alternative UI display of a representation of read ratio data analytics 242, where the representation of read ratio data analytics 242 is embedded within a UI tile that corresponds with a specific digital presentation document. For instance, a user may hover over or provide UI selection of a tile for digital presentation document 202, where the digital presentation service is configured to automatically surface the representation of read ratio data analytics 242 within the tile for the digital presentation document 202.

Figure 2E:
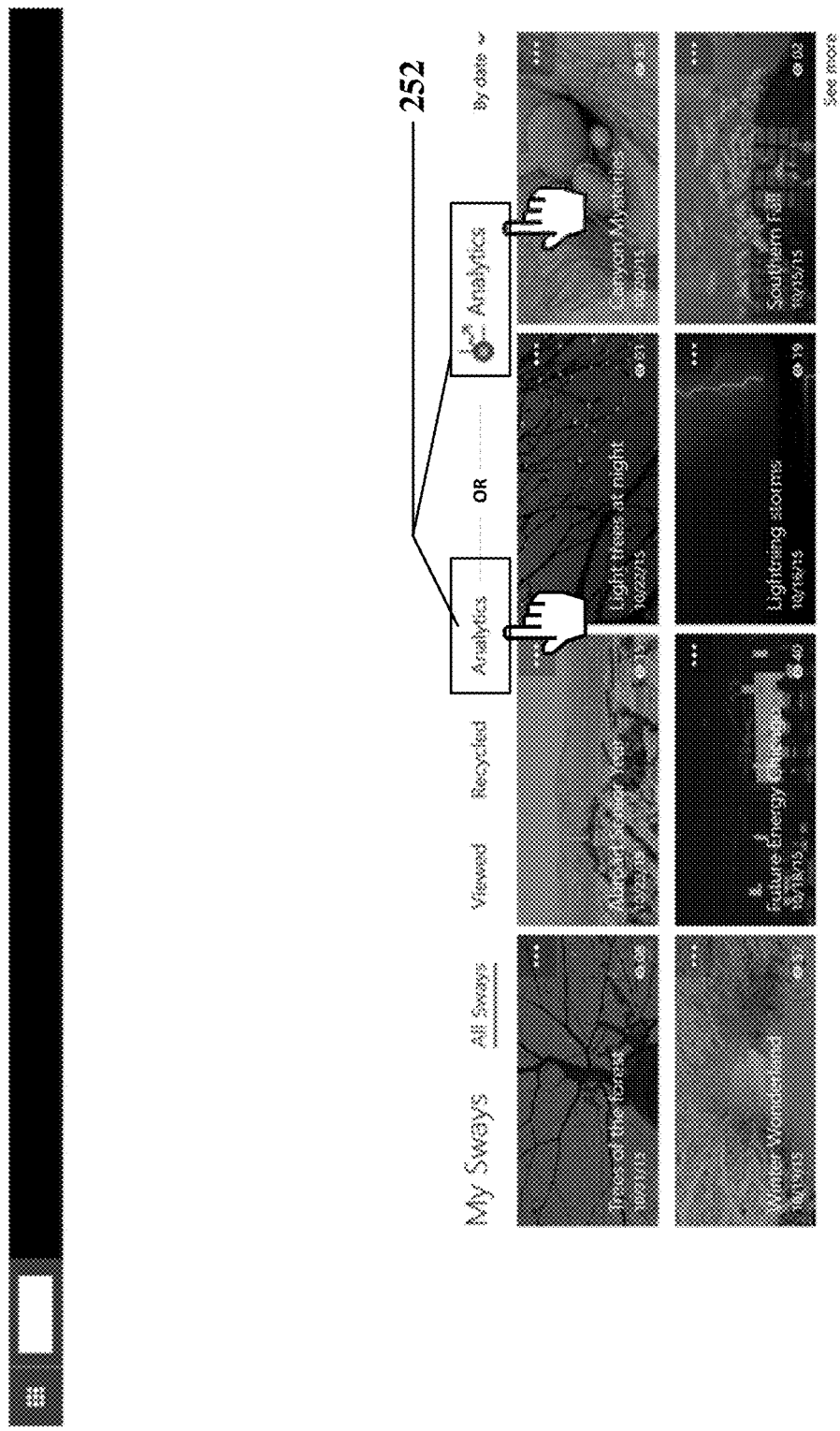

FIG. 2E illustrates processing device view 250, providing a display of a user interface for an exemplary digital presentation service. Processing device view 250 illustrates an alternative UI display for access to exemplary data analytics through a main application pane of the digital presentation service. In different examples, a user may select one of the UI analytics tabs 252 in the main application pane to trigger automatic surfacing of a representation of read ratio data analytics. In the example shown in processing device view 250, the user has not yet selected a specific digital presentation document.

Figure 2F:
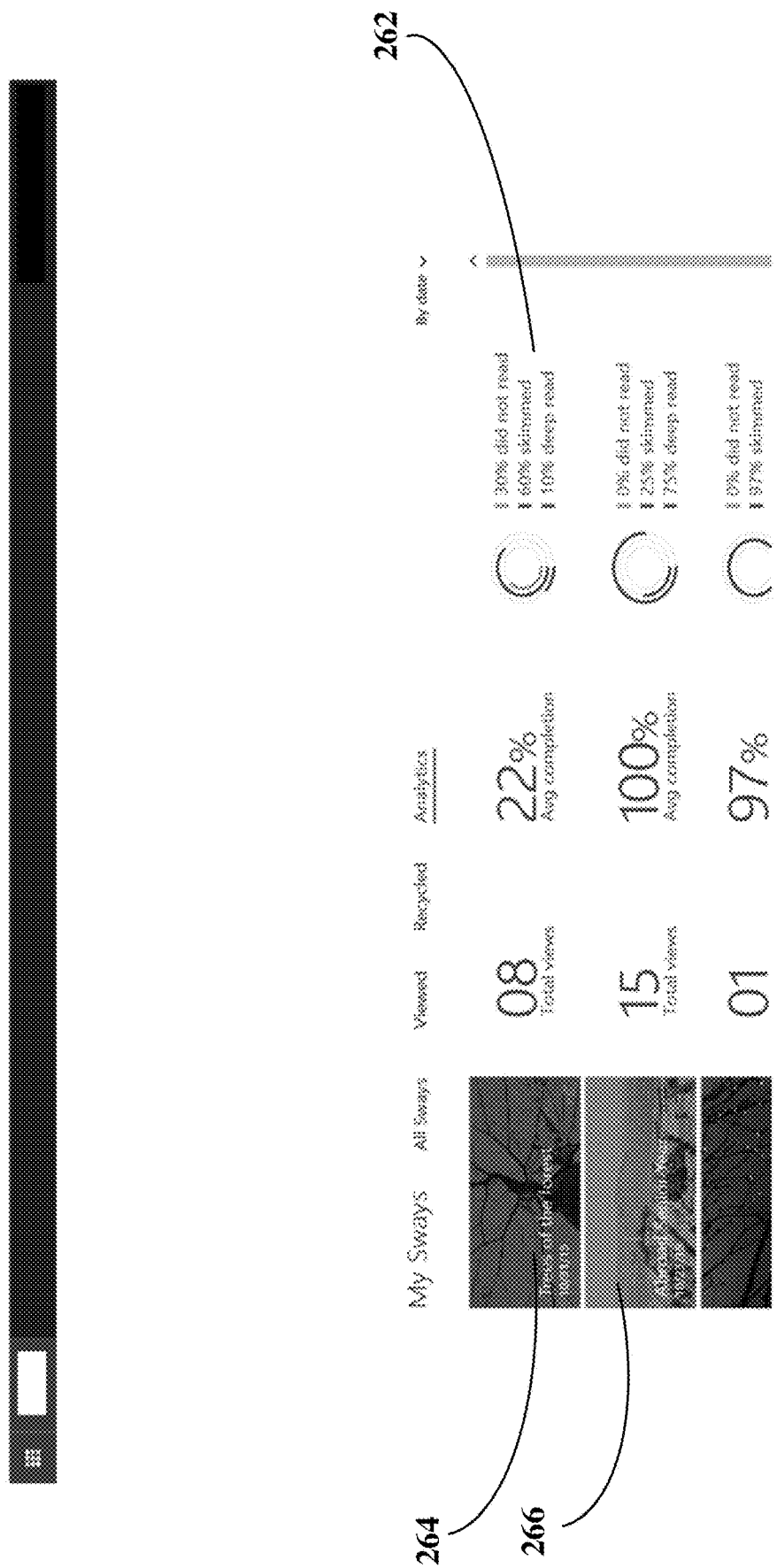
Figure 2G:
Figure 2G:
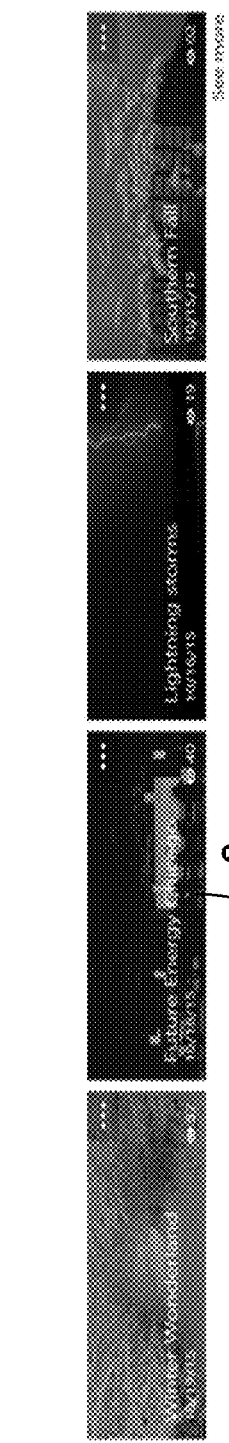

FIG. 2F illustrates processing device view 260, providing a display of a user interface for an exemplary digital presentation service. Processing device view 260 illustrates an example of a result of a user action 214 of selecting one of the UI analytics tabs 252 in the main application pane. As no specific digital presentation document is selected, an exemplary representation of read ratio data analytics 262 is presented for a plurality of different digital presentation documents that correspond with the user. For instance, the representation of read ratio data analytics 262 comprises read ratio data analytics for a first digital presentation document 264 and a second digital presentation document 266, where analytics for each separate digital presentation document are aggregated to a group-level for user access to that given digital presentation document. A user may select UI features through the representation of read ratio data analytics 262 to further drill into different levels of analysis for specific digital presentation documents.

FIG. 2E illustrates processing device view 270, providing a display of a user interface for an exemplary digital presentation service. Processing device view 270 illustrates a user action 272 selecting a UI tile for a specific digital presentation document (e.g. digital presentation document 202).

Figure 2H:
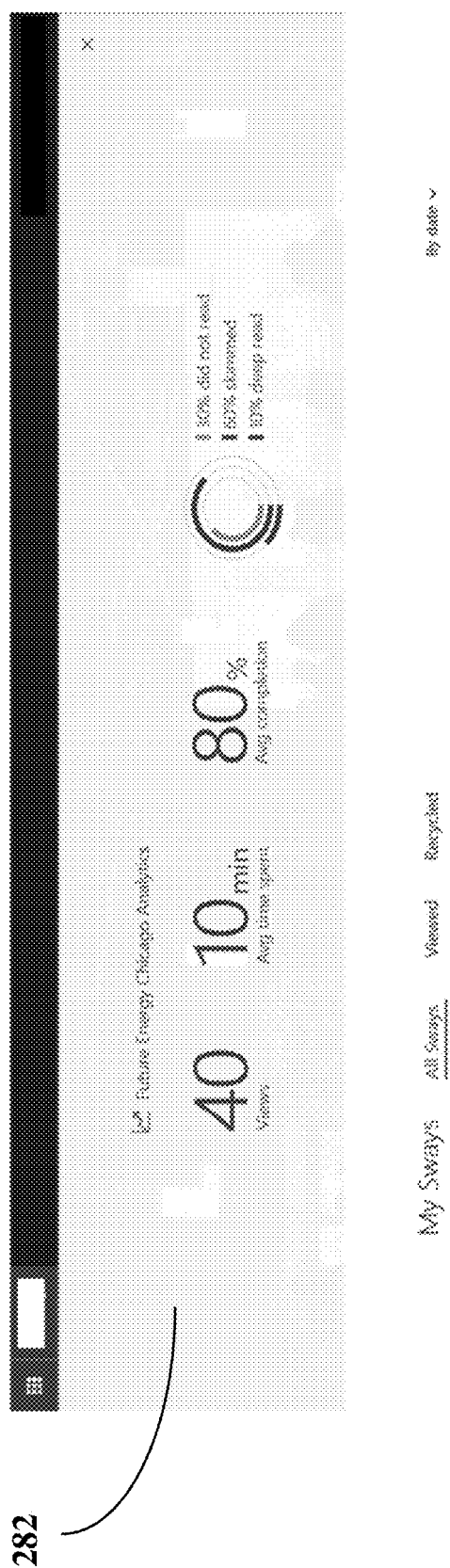

FIG. 2H illustrates processing device view 280, providing a display of a user interface for an exemplary digital presentation service. Processing device view 280 illustrates an example of a result of a user action 272 of selecting the UI tile for a specific digital presentation document (e.g. digital presentation document 202). Processing device view 280 illustrates automatic surfacing of an exemplary UI analytics banner 282 that provides a representation of read ratio data analytics for the specific digital presentation document. As can be seen in processing device view 280, the UI analytics banner 282 provides more detailed analytics analysis for a user as compared to the UI drop-down feature 212 (shown in FIG. 2B) as the UI analytics banner 282 encompasses a larger portion of the display space of the UI. The UI analytics banner 282 comprises read ratio data analytics that provide categorization of a level of depth of review of the digital presentation document by users (collectively). A user may select UI features through the UI analytics banner 282 to further drill into different levels of analysis for the specific digital presentation document (e.g. user-specific analytics).

FIGS. 3-5 and the associated descriptions provide a discussion of a variety of operating environments in which examples of the invention may be practiced. However, the devices and systems illustrated and discussed with respect to FIGS. 3-5 are for purposes of example and illustration and are not limiting of a vast number of computing device configurations that may be utilized for practicing examples of the invention, described herein.

FIG. 3 is a block diagram illustrating physical components of a computing device 302, for example a mobile processing device, with which examples of the present disclosure may be practiced. Among other examples, computing device 302 may be an exemplary computing device configured for management of generation and surfacing of exemplary data analytics in any of the examples as described herein. In a basic configuration, the computing device 302 may include at least one processing unit 304 and a system memory 306. Depending on the configuration and type of computing device, the system memory 306 may comprise, but is not limited to, volatile storage (e.g., random access memory), non-volatile storage (e.g., read-only memory), flash memory, or any combination of such memories. The system memory 306 may include an operating system 307 and one or more program modules 308 suitable for running software programs/modules 320 such as IO manager 324, other utility 326 and application 328. As examples, system memory 306 may store instructions for execution. Other examples of system memory 306 may store data associated with applications. The operating system 307, for example, may be suitable for controlling the operation of the computing device 302. Furthermore, examples of the invention may be practiced in conjunction with a graphics library, other operating systems, or any other application program and is not limited to any particular application or system. This basic configuration is illustrated in FIG. 3 by those components within a dashed line 322. The computing device 302 may have additional features or functionality. For example, the computing device 302 may also include additional data storage devices (removable and/or non-removable) such as, for example, magnetic disks, optical disks, or tape. Such additional storage is illustrated in FIG. 3 by a removable storage device 309 and a non-removable storage device 310.

As stated above, a number of program modules and data files may be stored in the system memory 306. While executing on the processing unit 304, program modules 308 (e.g., Input/Output (I/O) manager 324, other utility 326 and application 328) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 302 may also have one or more input device(s) 312 such as a keyboard, a mouse, a pen, a sound input device, a device for voice input/recognition, a touch input device, etc. The output device(s) 314 such as a display, speakers, a printer, etc. may also be included. The aforementioned devices are examples and others may be used. The computing device 302 may include one or more communication connections 316 allowing communications with other computing devices 318. Examples of suitable communication connections 316 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 306, the removable storage device 309, and the non-removable storage device 310 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 302. Any such computer storage media may be part of the computing device 302. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 4A and 4B illustrate a mobile computing device 400, for example, a mobile telephone, a smart phone, a personal data assistant, a tablet personal computer, a phablet, a slate, a laptop computer, and the like, with which examples of the invention may be practiced. Mobile computing device 400 may be an exemplary computing device configured for management of generation and surfacing of exemplary data analytics in any of the examples described herein. Application command control may be provided for applications executing on a computing device such as mobile computing device 400. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 4A, one example of a mobile computing device 400 for implementing the examples is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., touch screen display). If included, an optional side input element 415 allows further user input. The side input element 415 may be a rotary switch, a button, or any other type of manual input element. In alternative examples, mobile computing device 400 may incorporate more or less input elements. For example, the display 405 may not be a touch screen in some examples. In yet another alternative example, the mobile computing device 400 is a portable phone system, such as a cellular phone. The mobile computing device 400 may also include an optional keypad 435. Optional keypad 435 may be a physical keypad or a "soft" keypad generated on the touch screen display or any other soft input panel (SIP). In various examples, the output elements include the display 405 for showing a GUI, a visual indicator 420 (e.g., a light emitting diode), and/or an audio transducer 425 (e.g., a speaker). In some examples, the mobile computing device 400 incorporates a vibration transducer for providing the user with tactile feedback. In yet another example, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one example of a mobile computing device. That is, the mobile computing device 400 can incorporate a system (i.e., an architecture) 402 to implement some examples. In one examples, the system 402 is implemented as a "smart phone" capable of running one or more applications (e.g., browser, e-mail, calendaring, contact managers, messaging clients, games, and media clients/players). In some examples, the system 402 is integrated as a computing device, such as an integrated personal digital assistant (PDA), tablet and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device (e.g. system 402) described herein.

The system 402 has a power supply 470, which may be implemented as one or more batteries. The power supply 470 might further include an external power source, such as an AC adapter or a powered docking cradle that supplements or recharges the batteries.

The system 402 may include peripheral device port 430 that performs the function of facilitating connectivity between system 402 and one or more peripheral devices. Transmissions to and from the peripheral device port 430 are conducted under control of the operating system (OS) 464. In other words, communications received by the peripheral device port 430 may be disseminated to the application programs 466 via the operating system 464, and vice versa.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 566 via the operating system 464, and vice versa.

The visual indicator 420 may be used to provide visual notifications, and/or an audio interface 474 may be used for producing audible notifications via the audio transducer 425 (as described in the description of mobile computing device 400). In the illustrated example, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425 (shown in FIG. 4A), the audio interface 474 may also be coupled to a microphone to receive audible input, such as to facilitate a telephone conversation. In accordance with examples of the present invention, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio 472 or via a distributed computing network. Similarly, such data/information may be readily transferred between computing devices for storage and use according to well-known data/information transfer and storage means, including electronic mail and collaborative data/information sharing systems.

FIG. 5 illustrates one example of the architecture of a system for providing an application that reliably accesses target data on a storage system and handles communication failures to one or more client devices, as described above. The system of FIG. 5 may be an exemplary system configured for management of generation and surfacing of exemplary data analytics in any of the examples as described herein. Target data accessed, interacted with, or edited in association with programming modules 308 and/or applications 320 and storage/memory (described in FIG. 3) may be stored in different communication channels or other storage types. For example, various documents may be stored using a directory service 522, a web portal 524, a mailbox service 526, an instant messaging store 528, or a social networking site 530, IO manager 324, other utility 326, application 328 and storage systems may use any of these types of systems or the like for enabling data utilization, as described herein. A server 520 may provide storage system for use by a client operating on general computing device 302 and mobile device(s) 400 through network 515. By way of example, network 515 may comprise the Internet or any other type of local or wide area network, and a client node may be implemented for connecting to network 515. Examples of a client node comprise but are not limited to: a computing device 302 embodied in a personal computer, a tablet computing device, and/or by a mobile computing device 400 (e.g., mobile processing device). As an example, a client node may connect to the network 515 using a wireless network connection (e.g. WiFi connection, Bluetooth, etc.). However, examples described herein may also extend to connecting to network 515 via a hardwire connection. Any of these examples of the client computing device 302 or 400 may obtain content from the store 516.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
    aggregating client data, for access to a digital presentation document of a digital presentation service, to one or more levels of analysis corresponding with access to the digital presentation document by users of the digital presentation service;
    generating read ratio data analytics that evaluate user interaction with content of the digital presentation document based on an analysis of the aggregated client data at the one or more levels, wherein the read ratio data analytics comprise:
        a metric for categorization of levels of depth of review of the digital presentation document by the users that accessed the digital presentation document, wherein the metric for categorization of the levels of depth of review classifies user interaction with the digital presentation document into a plurality of categories that correspond to the levels of depth of review; and
    providing the read ratio data analytics to the digital presentation service, wherein a representation of the read ratio data analytics is surfaced in a user interface of the digital presentation service.

2. The method of claim 1, further comprising: surfacing the representation of the read ratio data analytics in the user interface of the digital presentation service, wherein the surfacing automatically surfaces the representation to a user account that manages the digital presentation document.

3. The method of claim 1, wherein the levels of depth of review comprise: a metric for users that accessed the digital presentation document but did not read the digital presentation document, a metric for users that accessed the digital presentation document and skimmed the digital presentation document and a metric for users that accessed the digital presentation document and completed a deep read of the digital presentation document.

4. The method of claim 1, further comprising: receiving a request, from the digital presentation service, for generation of the read ratio data analytics, wherein the generating generates the plurality of read ratio data analytics based on the request received from the digital presentation service.

5. The method of claim 1, further comprising: generating the representation of the read ratio data analytics at two or more levels of analysis, wherein the two or more levels of analysis comprise: individual read ratio data analytics at a user-specific level for one or more of the users and individual read ratio data analytics at a group level that corresponds to collective access to the digital presentation document by the users of the digital presentation service.

6. The method of claim 5, wherein the individual read ratio individual read ratio data analytics at the group level comprises two or more selected from a group consisting of: a metric for an average completion percentage associated with viewing of the digital presentation document by the users, a metric for average time spent accessing the digital presentation document by the users and a metric related to total viewership of the digital presentation document by the users.

7. The method of claim 6, further comprising: automatically surfacing the representation of the read ratio data analytics in the user interface of the digital presentation service, wherein the surfaced representation comprises the individual read ratio data analytics at the user-specific level and the individual read ratio data analytics at the group level.

8. A system comprising:
at least one processor; and
a memory, operatively connected with the at least one processor, storing computer-executable instructions that, when executed by the at least one processor, causes the at least one processor to execute a method that comprises:
aggregating client data, for access to a digital presentation document of a digital presentation service, to one or more levels of analysis corresponding with access to the digital presentation document by users of the digital presentation service;
generating read ratio data analytics that evaluate user interaction with content of the digital presentation document based on an analysis of the aggregated client data at the one or more levels, wherein the read ratio data analytics comprise:
a metric for categorization of levels of depth of review of the digital presentation document by the users that accessed the digital presentation document, wherein the metric for categorization of the levels of depth of review classifies user interaction with the digital presentation document into a plurality of categories that correspond to the levels of depth of review; and
providing the read ratio data analytics to the digital presentation service, wherein a representation of the read ratio data analytics is surfaced in a user interface of the digital presentation service.

9. The system of claim 8, wherein the method, executed by the at least one processor, further comprises: surfacing the representation of the read ratio data analytics in the user interface of the digital presentation service, wherein the surfacing automatically surfaces the representation to a user account that manages the digital presentation document.

10. The system of claim 8, wherein the levels of depth of review comprise: a metric for users that accessed the digital presentation document but did not read the digital presentation document, a metric for users that accessed the digital presentation document and skimmed the digital presentation document and a metric for users that accessed the digital presentation document and completed a deep read of the digital presentation document.

11. The system of claim 8, wherein the method, executed by the at least one processor, further comprises: receiving a request, from the digital presentation service, for generation of the read ratio data analytics, wherein the generating generates the plurality of read ratio data analytics based on the request received from the digital presentation service.

12. The system of claim 8, wherein the method, executed by the at least one processor, further comprises: generating the representation of the read ratio data analytics at two or more levels of analysis, wherein the two or more levels of analysis comprise: individual read ratio data analytics at a user-specific level for one or more of the users and individual read ratio data analytics at a group level that corresponds to collective access to the digital presentation document by the users of the digital presentation service.

13. The system of claim 12, wherein the individual read ratio individual read ratio data analytics at the group level comprises two or more selected from a group consisting of: a metric for an average completion percentage associated with viewing of the digital presentation document by the users, a metric for average time spent accessing the digital presentation document by the users and a metric related to total viewership of the digital presentation document by the users.

14. The system of claim 13, wherein the method, executed by the at least one processor, further comprises: automatically surfacing the representation of the read ratio data analytics in the user interface of the digital presentation service, wherein the surfaced representation comprises the individual read ratio data analytics at the user-specific level and the individual read ratio data analytics at the group level.

15. A computer-readable storage medium storing computer-executable instructions that, when executed by at least one processor, causes the at least one processor to execute a method comprising:
aggregating client data, for access to a digital presentation document of a digital presentation service, to one or more levels of analysis corresponding with access to the digital presentation document by users of the digital presentation service;
generating read ratio data analytics that evaluate user interaction with content of the digital presentation document based on an analysis of the aggregated client data at the one or more levels, wherein the read ratio data analytics comprise:
a metric for categorization of levels of depth of review of the digital presentation document by the users that accessed the digital presentation document, wherein the metric for categorization of the levels of depth of review classifies user interaction with the digital presentation document into a plurality of categories that correspond to the levels of depth of review; and
providing the read ratio data analytics to the digital presentation service, wherein a representation of the read ratio data analytics is surfaced in a user interface of the digital presentation service.

16. The computer-readable storage medium of claim 15, wherein the executed method further comprising: surfacing the representation of the read ratio data analytics in the user interface of the digital presentation service, wherein the surfacing automatically surfaces the representation to a user account that manages the digital presentation document.

17. The computer-readable storage medium of claim 15, wherein the levels of depth of review comprise: a metric for users that accessed the digital presentation document but did not read the digital presentation document, a metric for users that accessed the digital presentation document and skimmed the digital presentation document and a metric for users that accessed the digital presentation document and completed a deep read of the digital presentation document.

18. The computer-readable storage medium of claim 15, wherein the executed method further comprising: receiving a request, from the digital presentation service, for generation of the read ratio data analytics, wherein the generating generates the plurality of read ratio data analytics based on the request received from the digital presentation service.

19. The computer-readable storage medium of claim 15, wherein the executed method further comprising: generating the representation of the read ratio data analytics at two or more levels of analysis, wherein the two or more levels of analysis comprise: individual read ratio data analytics at a user-specific level for one or more of the users and individual read ratio data analytics at a group level that corresponds to collective access to the digital presentation document by the users of the digital presentation service, and wherein the individual read ratio individual read ratio data analytics at the group level comprises two or more selected from a group consisting of: a metric for an average completion percentage associated with viewing of the digital presentation document by the users, a metric for average time spent accessing the digital presentation document by the users and a metric related to total viewership of the digital presentation document by the users.

20. The computer-readable storage medium of claim 19, wherein the executed method further comprising: automatically surfacing the representation of the read ratio data analytics in the user interface of the digital presentation service, wherein the surfaced representation comprises the individual read ratio data analytics at the user-specific level and the individual read ratio data analytics at the group level.

* * * * *